United States Patent [19]
Fried et al.

[11] Patent Number: 5,681,903
[45] Date of Patent: Oct. 28, 1997

[54] PROCESS FOR THE PREPARATION OF POLYMERIC ALPHA, OMEGA-DIALDEHYDES AND DIACIDS

[75] Inventors: Herbert Elliott Fried, Houston; Michael Wayne Potter, Sugar Land, both of Tex.

[73] Assignee: Shell Oil Company, Houston, Tex.

[21] Appl. No.: 575,377

[22] Filed: Dec. 20, 1995

[51] Int. Cl.$^6$ ........................................ C08F 8/30
[52] U.S. Cl. .................. 525/377; 525/332.1; 525/332.8; 525/332.9; 525/333.1; 525/333.2
[58] Field of Search ................................ 525/377

[56] References Cited

U.S. PATENT DOCUMENTS

| | | | |
|---|---|---|---|
| 3,360,517 | 12/1967 | Rowland et al. | 525/377 |
| 4,342,849 | 8/1982 | Kennedy et al. | 525/366 |
| 4,429,099 | 1/1984 | Kennedy et al. | 525/384 |
| 4,620,033 | 10/1986 | Isshiki et al. | 562/519 |
| 4,845,158 | 7/1989 | Peters | 525/377 |
| 4,885,338 | 12/1989 | Takao et al. | 525/377 |
| 5,136,101 | 8/1992 | Fried | 568/402 |
| 5,136,107 | 8/1992 | Fried | 568/402 |
| 5,153,271 | 10/1992 | Lawson et al. | 525/377 |
| 5,155,278 | 10/1992 | Fried | 568/471 |
| 5,155,279 | 10/1992 | Fried | 568/471 |
| 5,155,280 | 10/1992 | Fried | 568/471 |
| 5,162,579 | 11/1992 | Fried | 562/537 |
| 5,166,422 | 11/1992 | Fried | 562/537 |
| 5,166,423 | 11/1992 | Fried | 562/537 |
| 5,175,359 | 12/1992 | Fried | 562/537 |
| 5,175,360 | 12/1992 | Fried | 562/538 |
| 5,179,218 | 1/1993 | Fried | 554/134 |

FOREIGN PATENT DOCUMENTS 5096516  7/1975  Japan.

OTHER PUBLICATIONS

Miyazawa et al., "Oxidation of Benzyl Alcohol with Iron(III) Using Polymers Containing Nitroxyl Radical Structure as a Mediator," J. Polym. Sci., Polym. Chem. Ed., 23 (9), 1985, pp. 2487–2494.

Grigopr'ev et al., "Participation of Nitroxyl Radical in the Oxidation of Aldehyde and Alcohol Groups in 3–imidazolin–1–oxyls," Izc. Akad. Nauk SSSR, Ser. Khim., (1), 1978, pp. 208–210. (Abstract Only).

Miyazawa et al., "Oxidation of Benzyl Alcohol with Copper(II) Mediated by a Polymeric Oxoaminium Salt," J. Mol. Catal., 49(1), 1988, 131–134. (Abstract only).

Ganem et al., "Biological Spin Labels as Organic Reagents. Oxidation of Alcohols to Carbonyl Compounds Using Nitroxyls," J. Org. Chem., 40(13), 1975, pp. 1998–2000. (Abstract Only).

Miyazawa et al., "Oxidation of Benzyl Alcohol by Iron(III) Mediated by Nitroxyl Radical." J. Mol. Catal., 31(2), 1985, pp. 217–220.

Annelli et al., "Fast and Selective Oxidation of Primary Alcohols to Aldehydes or to Carboxylic Acids and of Secondary Alcohols to Ketones Mediated by Oxoammonium Salts under Two–Phase Conditions," J. Org. Chem., 52(12), 1987, pp. 2559–2562.

Inokuchi et al., "A Selective and Efficient Method for Alcohol Oxidations Mediated by N–Oxoammonium Salts in Combination with Sodium Bromite," J. Org. Chem., 1990, 55 pp. 462–466.

Organic Synthesis, vol. 69, p. 212 (1990).

Sammelhack et al., "Oxidation of Alcohols to aldehydes with Oxygen and Cupric Ion, Mediated by Nitrosonium Ion," J. Am. Chem. Soc., 1984, 106, 3374–3376.

Yamaguchi et al., "Application of Redox System Based on Nitroxides to Organic Synthesis," Pure & Applied Chemistry, vol. 62(2), 1990, 217–222.

E. S. Kagan et al., "Chemistry of Hindered Amines from the Piperidine Series", Synthesis, 1984, pp. 895–916.

R. M. Dupeyre et al., "Nitroxides. XIX. Norpseudopelletierine–N–oxyl, a New, Stable, Unhindered Free Radical," JACS, 88 (13), 1966, pp. 3180–3181.

E. G. Rozantsev et al., "Synthesis and Reaction of Stable Nitroxyl Radicals I. Synthesis" Synthesis, Apr. 1971, pp. 190–202.

E. G. Rozantsev et al., "Synthesis and Reaction of Stable Nitroxyl Radicals II. Reactions," Synthesis, Apr. 1971, pp. 401–414.

Maurice Morton, Anionic Polymerization: Principles and Practice, a,w–Difunctional Polymers, Academic Press, 1983, pp. 233–239.

*Primary Examiner*—Bernard Lipman
*Attorney, Agent, or Firm*—Pamela J. McCollough

[57] ABSTRACT

A process for the preparation of polymeric alpha,omega-dialdehydes, diacids and mixtures thereof, which process comprises reacting a corresponding polymeric aliphatic alkanediol with a stable free radical nitroxide in the presence of a $NO_x$-generating compound, an oxidant and, optionally, a solvent and/or a bromide-containing compound, and thereafter separating out the polymeric alpha,omega-dialdehyde and/or diacid.

20 Claims, No Drawings

PROCESS FOR THE PREPARATION OF POLYMERIC ALPHA, OMEGA-DIALDEHYDES AND DIACIDS

FIELD OF THE INVENTION

This invention relates to a process for the preparation of polymeric alpha,omega-dialdehydes and diacids by the oxidation of the corresponding polymeric aliphatic alkanediols in the presence of a stable free radical nitroxide, a $NO_x$-generating compound, an oxidant and, optionally, a solvent and/or a bromide-containing compound.

BACKGROUND OF THE INVENTION

It is known to use nitroxyl radicals/oxoammonium salts in the oxidation of primary alcohols to produce aldehydes and acids and secondary alcohols to ketones (*Journal of Organic Chemistry*, vol. 52 (12), pp. 2559–2562, and *Journal of Organic Chemistry*, vol. 55, 1990, pp. 462–466).

It is reported in the open literature that primary aliphatic alcohols can be converted to aldehydes in 30-40% yields in the presence of catalytic amounts of cuprous chloride, 2,2,6,6-tetramethylpiperidine-1-oxyl, and atmospheric oxygen (*Journal of American Chemical Society*, 1984, 106, pp. 3374). It is also known that higher yields of aldehydes can be obtained if stoichiometric amounts of cupric or ferric salts are used instead of catalytic amounts of the cuprous salts (*Pure and Applied Chemistry*, vol. 62(2), 1990, pp. 217–222).

It has been found that polymeric alpha,omega-dialdehydes and diacids can be produced in good yields from polymeric aliphatic alkanediols without producing large amounts of other products such as esters. This can be accomplished by using catalytic amounts of a stable free radical nitroxide, a $NO_x$-generating compound, an oxidant and, optionally, a solvent and/or a bromide-containing compound.

SUMMARY OF THE INVENTION

This invention relates to a process for the preparation of polymeric alpha,omega-dialdehydes and diacids which comprises reacting a corresponding polymeric aliphatic alkanediol having the formula $HOCH_2$—(R)—$CH_2OH$ (I) wherein R represents a hydrogenated butadiene polymer, a hydrogenated isoprene polymer, a hydrogenated piperylene polymer, a hydrogenated hexadiene polymer, a hydrogenated methylpentadiene polymer, a hydrogenated phenylbutadiene polymer, a hydrogenated 3,4-dimethyl-1,3-hexadiene polymer, or a hydrogenated 4,5-diethyl-1,3-octadiene polymer, with a stable free radical nitroxide having the formula:

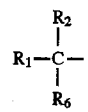

wherein (1) (a) each of $R_1$, $R_2$, $R_3$ and $R_4$ is an alkyl, aryl or substituted alkyl group having 1 to about 15 carbon atoms, and (b) $R_5$ and $R_6$ (i) each is an alkyl group having 1 to about 15 carbon atoms provided that $R_1$–$R_6$, are not all alkyl groups, or a substituted alkyl group having 1 to about 15 carbon atoms wherein the substituent is hydrogen, cyano, —$CONH_2$, —$OCOCH$, $OCOC_2H_5$, carbonyl, alkenyl wherein the double bond is not conjugated with the nitroxide moiety, or —COOR wherein R of the —COOR group is alkyl or aryl, or (ii) together form part of a ring that contains at least 3 carbon atoms and up to two heteroatoms of O or N, or (2) the

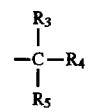

moiety and the

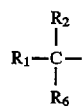

moiety individually are aryl, or (3) the

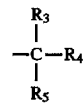

moiety and the

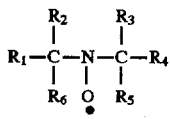

moiety together form a bicyclic ring with the proviso that the group directly adjacent to the

moiety is a bridgehead C—H, or a fully alkylated carbon, in the presence of a $NO_x$-generating compound, an oxidant and, optionally, a solvent and/or a bromide-containing solvent, and thereafter separating out the dialdehydes and/or diacids.

DESCRIPTION OF THE PREFERRED EMBODIMENTS

The present process converts polymeric aliphatic alkanediols having the formula $HOCH_2$—(R)—$CH_2OH$ (I) wherein R represents a hydrogenated butadiene polymer, a hydrogenated isoprene polymer, a hydrogenated piperylene polymer, a hydrogenated hexadiene polymer, a hydrogenated methylpentadiene polymer, a hydrogenated phenylbutadiene polymer, a hydrogenated 3,4-dimethyl-1,3-hexadiene polymer, or a hydrogenated 4,5-diethyl-1,3-octadiene polymer, to the corresponding dialdehydes and/or diacids acids by contacting the polymeric aliphatic alkanediol with a stable free radical nitroxide in the presence of a $NO_x$-generating compound, an oxidant and, optionally, a solvent and/or a bromide-containing compound, and thereafter separating out the polymeric alpha,omega-dialdehyde and/or diacid. The R groups in the above formula I can be substituted with any substituents which do not interfere with the oxidation of the hydroxy group. Such substituents include —OR", —$CH_2$, —COOH, $CONH_2$, and COOR" wherein R" is an alkyl or aryl group. The process of the instant invention is particularly suited to alpha,omega-dihydroxy-terminated polymers which are greater than about 95% hydrogenated or saturated.

These polymers can be prepared by copolymerizing one or more olefins, particularly diolefins, by themselves or with one or more alkenyl aromatic hydrocarbon monomers. The copolymers may, of course, be random, tapered, block or a combination of these, as well as linear, radial or star.

The alpha,omega-dihydroxy-terminated polymers may be prepared using functionalized protected anionic initiators or polymerization catalysts, followed by end-capping, hydrogenation and removal of the protected group. Such polymers may be prepared using bulk, solution or emulsion techniques.

In general, when solution anionic techniques are used, copolymers of conjugated diolefins are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds containing functionalized protected groups as described in U.S. Pat. Nos. 5,405,911 and 5,416,168, the teachings of which are incorporated herein by reference. The living anionic polymers of unsaturated monomers thus produced are then reacted with oxetane or an alkyl-substituted oxetane to provide terminal hydroxy groups, as described in U.S. Pat. No. 5,418,296, the teachings of which are incorporated herein by reference. These terminal hydroxy groups can also be obtained by reacting the living anionic polymers with ethylene oxide. Following end-capping, the materials are subjected to hydrogenation, followed by acid hydrolysis to remove the protecting group.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The polymeric aliphatic alkanediols suitable for use as a starting material in the process of the present invention generally have molecular weights in the range of from about 500 to about 500,000. Lower molecular weights require excessive crosslinking whereas higher molecular weights cause very high viscosity, making processing very difficult. More preferably, the polymeric aliphatic alkanediol is one having a molecular weight of in the range of from about 1,000 to about 50,000. Most preferably, the polymeric aliphatic alkanediol has a molecular weight in the range of from about 2,000 to about 10,000.

The term "stable free radical nitroxide" as used herein shall mean a free radical nitroxide that can be prepared by conventional chemical methods and will exist long enough to be used in a subsequent chemical reaction or examined in a static system by normal methods of spectroscopy. Generally, the stable free radical nitroxides of the present invention have a half life of at least one year. The term "stable free radical" shall also be understood to include the precursor to a stable free radical from which the stable free radical may be produced in situ.

The stable free radical nitroxides, as used in the present process, are precursors to catalysts, i.e., oxoammonium salts, active for the oxidation of polymeric aliphatic alkanediols to the corresponding dialdehydes and/or diacids. These catalysts are generated in situ by the oxidation of a stable free radical nitroxide to an oxoammonium salt with an oxygen-containing oxidant. The stable free radical nitroxide can be obtained by the oxidation of amines or hydroxylamines.

The stable free radical nitroxides which are suitable for use in the instant invention have the formula:

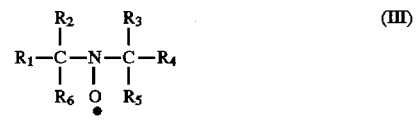

wherein each of $R_1$, $R_2$, $R_3$ and $R_4$ is an alkyl, aryl or substituted alkyl groups and no hydrogen is bound to the remaining valences on the carbon atoms bound to the nitrogen. As used herein, the term "alkyl" is meant to include cycloalkyl. The alkyl (or substituted) groups $R_1$–$R_4$ may be the same or different, and preferably contain 1 to 15 carbon atoms. Preferably, $R_1$–$R_4$ are methyl, ethyl, or propyl groups. In addition to hydrogen, the substituents may include, halogen, oxygen, nitrogen and the like.

The remaining valences ($R_5$ and $R_6$) in formula III above may be satisfied by any atom or group except hydrogen which can bond covalently to carbon, although some groups may reduce the stabilizing power of the nitroxide and are undesirable. When $R_1$, $R_2$, $R_3$ and $R_4$ are each alkyl groups, however, at least one of $R_5$ and $R_6$ must be an aryl group. Preferably, $R_5$ and $R_6$ are substituted alkyl groups having 1 to about 15 carbon atoms wherein the substituent is selected from halogen, cyano, —COOR, wherein R is alkyl or aryl, —CONH$_2$, —OCOC$_2$H$_5$, carbonyl, or alkenyl where the double bond is not conjugated with the nitroxide moiety, or alkyl groups of 1 to about 15 carbon atoms.

The remaining valences ($R_5$ and $R_6$) in formula III above may also form a ring containing at least three carbon atoms and up to two heteroatoms, such as O or N. $R_5$ and $R_6$ can, for example, form a five-membered ring containing 3 carbon atoms and up to two heteroatoms, such as O or N, a five-membered ring containing 4 carbon atoms, a six-membered ring containing 5 carbon atoms, a seven-membered ring containing 6 carbon atoms, an eight-membered ring containing 7 carbon atoms, etc. For purposes of this invention, it is preferred that $R_5$ and $R_6$ together form a five-membered ring, a six-membered ring, a seven-membered ring, or an eight-membered ring, although larger rings would also be suitable. Examples of suitable compounds having the structure above and in which $R_5$ and $R_6$ form part of the ring are 2,2,6,6,-tetramethylpiperidine-1-oxyl, 2,2,5,5-tetramethylpyrrolidin-1-oxyl, 2,2,7,7-tetramethylcycloheptan-1-oxyl, mixtures thereof, and the like. It is understood that these compounds may contain substituents which do not interfere with the reaction.

The

and the

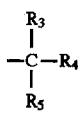

moieties in formula III above can individually be aryl, i.e.,

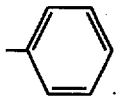

Examples of suitable compounds having the structure above in which the

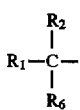

and the

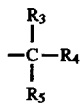

moieties are individually aryl are diphenylamine-N-oxyl, phenyl tertiary butylamine-N-oxyl, 3-methylphenyl phenylamine-N-oxyl, 2-chlorophenyl phenylamine-N-oxyl and the like. These compounds may be substituted with an substituents which do not interfere with the reaction.

The

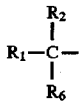

and the

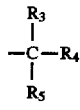

moieties in formula III above can also form a bicyclic ring wherein the group adjacent to the

moiety is either a bridgehead C—H or a quaternary carbon. As used herein, the term "bridgehead C—H" refers to a tertiary carbon which is common to both rings of the bicyclic ring system. As used herein, "a quaternary carbon" refers to a fully substituted carbon atom having alkyl, aryl or substituted alkyl groups having 1 to about 18 carbon atoms as substituents. Examples of suitable compounds having the structure above in which the

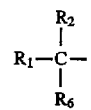

and the

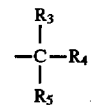

moieties form a bicyclic ring are 2-azabicyclo[2.2.1]heptan-2-oxyl, 2-azabicyclo[2.2.2]-3,3-dimethyloctan-2-oxyl, 3-azabicyclo[3.2.2]-2,2,4,4-tetramethylnonan-3-oxyl and the like. These compounds may be substituted with any substituents which do not interfere with the reaction.

In a preferred embodiment, the stable free radical nitroxide is a piperidine-1-oxyl having the formula:

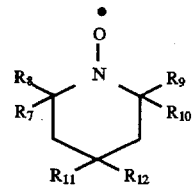

wherein each of $R_7$, $R_8$, $R_9$ and $R_{10}$ is an alkyl, aryl or substituted alkyl group having 1 to about 15 carbon atoms and no hydrogen is bound to the remaining valences on the carbon atoms bound to the nitrogen, and each of $R_{11}$, and $R_{12}$ is alkyl, hydrogen, aryl or a substituted heteroatom. As used herein, the term "alkyl" is meant to include cycloalkyl. The alkyl (or substituted) groups $R_7$–$R_{10}$ may be the same or different, and preferably contain 1 to 15 carbon atoms. Preferably, $R_7$–$R_{10}$ are methyl, ethyl, or propyl groups. In addition to hydrogen, the substituents may include, halogen, oxygen, nitrogen and the like. Typically, one of $R_{11}$ and $R_{12}$ is hydrogen, with the other one being a substituted heteroatam which does not interfere with the reaction. Suitable substituted heteroatoms include

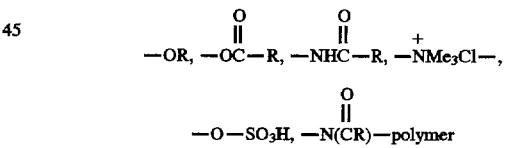

and the like.

In a particularly preferred embodiment, the nitroxide is selected from the group consisting of 2,2,6,6-tetramethylpiperidine-1-oxyl, 4-hydroxy-2,2,6,6-tetramethylpiperidine-1-oxyl, 4-methoxy-2,2,6,6-tetramethylpiperidine- 1-oxyl, 4-ethoxy-2,2,6,6-tetramethylpiperidine-1-oxyl, 4-carbamoyl-2,2,6,6-tetramethylpiperidine-1-oxyl, 4-acetylamino-2,2,6,6-tetramethylpiperidine-1-oxyl, 4-benzoylamino-2,2,6,6-tetramethyl-piperidine-1-oxyl, 4-pivaloylamino-2,2,6,6-tetramethylpiperidine-1-oxyl, 4-dodecyloylamino-2,2,6,6-tetramethylpiperidine-1-oxyl, 4-dodecanoylamino-2,2,6,6-tetramethylpiperidine-1-oxyl, 4-octanoylamino-2,2,6,6-tetramethylpiperidine-1-oxyl and mixtures thereof, with 2,2,6,6-tetramethylpiperidine-1-oxyl, 4-acetylamino-2,2,6,6-tetramethylpiperidine-1-oxyl, and 4-methoxy-2,2,6,6-tetramethylpiperidine-1-oxyl being especially preferred.

The $NO_x$-generating compound in the present process is typically nitric acid. However, any compound which serves to generate $NO_x$ during the course of the reaction such as, for example, an alkali metal nitrosodisulfonate, and which does not interfere with the reaction would be suitable. While not wishing to be bound by any particular theory, it is believed that nitrogen oxides ($NO_x$) are generated in the reaction and are the active species in the reaction.

As used herein, the term "nitric acid" refers to nitric acid, fuming nitric acid or nitrous acid, generated by contacting a nitrate or nitrite salt such as, for example, an alkali metal salt, a tetraalkylammonium salt, an alkaline earth salt or a rare earth salt, with a strong acid such as, for example, a mineral acid. The nitric acid suitable for use as a $NO_x$-generating compound in the present invention typically has a concentration in the range of from about 50 percent to about 100 percent, preferably about 70 percent. Generally, an amount of nitric acid in the range of from about 20 mole percent to about 500 mole percent, basis the moles of starting polymeric aliphatic alkane diol is utilized. The nitric acid is typically added to the reaction mixture after all of the other reactants have been added.

The reaction of the present invention can be carried out in the presence or absence of a solvent. In a preferred embodiment, the reaction is carried out in the presence of a solvent. When the starting polymeric aliphatic alkanediol has a melting point greater than about 50° C., a solvent must be utilized. When a solvent is utilized, the solvent is generally one in which the starting polymeric aliphatic alkanediol is readily soluble. Solvents which are most suitable are solvents which are inert in the reaction. The nitroxide and nitric acid may be added to the solvent and the diol mixture, or alternatively, the nitroxide may be dissolved in the solvent prior to addition of the nitroxide to the reaction medium. The solvent is typically selected from the group consisting of chlorinated hydrocarbons, hydrocarbons, aromatic hydrocarbons and mixtures thereof. When the desired product is primarily acids, a chlorinated hydrocarbon solvent is particularly preferred. Tertiary alcohols may also be utilized as co-solvents in the process of the present invention. In a preferred embodiment, the solvent is selected from the group consisting of dichloromethane, carbon tetrachloride, tertiary butyl alcohol/heptane, chlorobenzene, xylene, and mixtures thereof. The amount of solvent utilized in the process is typically in the range of from about 0.5:1 to about 100:1, preferably from about 1:1 to about 10:1, basis the weight of the starting polymeric aliphatic alkanediol. When a solvent is utilized, the reaction is carried out at a temperature in the range of from about 20° C. to about 60° C.

The reaction in the present invention may also be carried out in the presence of a bromide-containing compound. Suitable bromide ion-containing compounds include any ionic bromides which are in a soluble form. When present, the bromide ion is suitably introduced into the process as a quaternary alkyl bromide such as, for example, ammonium bromide, a tetraalkyl bromide such as, for example, tetramethyl ammonium bromide, an alkali metal bromide such as for example, sodium bromide, potassium bromide, lithium bromide, calcium bromide and the like. Preferably, the bromide ion-containing compound is selected from the group consisting of ammonium bromide, sodium bromide, potassium bromide and mixtures thereof, with potassium bromide being particularly preferred.

The process of the present invention is also carried out in the presence of an oxidant. Oxidants suitable for use in the instant invention are those compounds which are capable, in the presence of a $NO_x$-generating compound, of oxidizing the stable free radical nitroxide to the oxoammonium salt. Suitable oxidants include oxygen-containing gases such as pure oxygen and oxygen in air. Whereas pure oxygen can be used to accomplish the desired conversion, the oxygen can also be diluted with an inert gas such as nitrogen, helium, argon, or other similar gas. For purposes of increasing the reaction rate, higher $O_2$ pressures such as, for example, up to about 2000 psig can be utilized. In a preferred embodiment, pure oxygen is used as the oxidant and it is bubbled into the reaction solution at ambient pressure. In another embodiment, the reaction solution can be sparged with air at pressures of up to about 2000 psig.

The amounts and concentrations of the reactants utilized in the process of the instant invention can vary within wide ranges. The amount of stable free radical nitroxide is typically in the range of from about 0.01 mole percent to about 200 mole percent, preferably from about 50 mole percent to about 100 mole percent, basis the number of moles starting polymeric aliphatic alkanediol. Generally, the amount of $NO_x$-generating compound used is in the range of from about 20 mole percent to about 500 mole percent, basis the number of moles of polymeric aliphatic alkanediol.

The process of the present invention is typically conducted under mild conditions, with good results being obtained using a temperature in the range of from about 0° C. to about 60° C. in the absence of a solvent, preferably about 30° C. to about 50° C., and most preferably, about 35° C. to about 45° C. When a solvent is utilized the preferred reaction temperature is in the range of from about 20° C. to about 60° C. Reaction pressures are not critical although higher pressures can result in increased reaction rates. Pressures in the range of from about atmospheric pressure up to about 2000 psig can be employed with good results.

The process of the instant invention can be carried out either batchwise or continuously, using a stirrer equipped reactor or other well known contacting technique to achieve adequate mixing. Preferred reaction conditions, e.g., temperature, pressure, flow rates, etc., vary somewhat depending on the specific nitroxide utilized and on the concentration of the nitroxide.

The process of the instant invention can be carried out in a variety of ways. For example, 0.0071 moles of polymeric aliphatic alkanediol, and 0.0064 moles of the nitroxide, and solvent may be added to the reaction vessel, followed by the addition of 0.011 moles of 70 percent nitric acid and bubbling oxygen through the reaction mixture. Following the reaction, the product may be separated from the reaction mixture using conventional procedures such as extraction using a suitable extraction solvent such as, for example, the reaction solvent; evaporation wherein the solvent is stripped from the reaction mixture by using heat or vacuum. The reaction product can be purified by a number of conventional means such as high temperature water washing.

Depending upon process conditions and the nitroxide used, the selectivity to polymeric alpha,omega-dialdehydes or diacids obtained by this invention can be high, generally greater than about 70%. The products produced by the instant process are useful in making coatings, sealants, binders, and block copolymers with polyesters, polyamides and polycarbonates.

The ranges and limitations provided in the instant specification and claims are those which are believed to particularly point out and distinctly claim the present invention. It is, however, understood that other ranges and limitations which perform substantially the same function in the same or substantially the same manner to obtain the same or substantially the same result are intended to be within the scope of the instant invention as defined by the instant specification and claims.

The process of this invention will be further described by the following embodiments which are provided for illustration and are not to be construed as limiting the invention.

ILLUSTRATIVE EMBODIMENTS

Example 1

25 Grams of hydrogenated polybutadiene diol, i.e., hydrogenated poly(ethylene/butylene) diol, having a molecular weight of 3600, 1.0 gram of 2,2,6,6-tetramethylpiperidine-1-oxyl, 1 gram of 70 percent nitric acid, 0.5 grams of potassium bromide dissolved in 1 gram of water and 40 milliliters of dichloromethane were charged to a 100 milliliter round bottomed flask. $O_2$ was bubbled through this mixture at a rate of 35 milliliters/minute at ambient pressure. The reaction temperature was held at reflux over a 6-hour period. The results are presented in Table I.

Example 2

25 Grams of hydrogenated polybutadiene diol having a molecular weight of 3600, 1.0 gram of 2,2,6,6-tetramethylpiperidine-1-oxyl, 1 gram of 70 percent nitric acid, 1 gram of water and 50 milliliters of dichloromethane were charged to a 100 milliliter round bottomed flask. $O_2$ was bubbled through this mixture at a rate of 35 milliliters/minute at ambient pressure. The reaction was held at reflux over a 7-hour period. The results are presented in Table I.

Example 3

25 Grams of hydrogenated polybutadiene diol having a molecular weight of 3600, 1.0 gram of 2,2,6,6-tetramethylpiperidine-1-oxyl and 50 milliliters of a 10% tertiary butyl alcohol/heptane mixture, 0.5 grams of potassium bromide dissolved in 1 gram of water and 1 gram of 70 percent nitric acid were charged to a 100 milliliter round bottomed flask. $O_2$ was bubbled through this mixture at a rate of 35 milliliters/minute at ambient pressure. The reaction was held at 40° C. over a 6-hour period. This mixture was then left open to the air overnight. The results are presented in Table I.

Example 4

25 Grams of hydrogenated polybutadiene diol having a molecular weight of 4600, 1.0 gram of 2,2,6,6-tetramethylpiperidine-1-oxyl, 1 gram of 70 percent nitric acid, 0.5 grams of potassium bromide dissolved in 1 gram of water and 40 milliliters of dichloromethane were charged to a 100 milliliter round bottomed flask. $O_2$ was bubbled through this mixture at a rate of 35 milliliters/minute at ambient pressure. The reaction temperature was held at reflux over a 6-hour period. The results are presented in Table I.

Comparative Example A

Comparative Example A was carried out in a manner similar to Example 1 except that no nitroxide was used. The results are presented in Table I.

Comparative Example B

Comparative Example B was carried out in a manner similar to Example 1 except that no nitric acid was used. The results are presented in Table I.

As can be seen in Table I, nitroxide and nitric acid are necessary for the oxidation of the polymeric aliphatic alkanediol to proceed.

TABLE I

Oxidation of Polymeric Aliphatic Alkanediols to Polymeric Alpha, Omega-Dialdehydes and/or Diacids

|  | % Conversion | % Sel. to Dialdehydes | % Sel. to Diacids |
|---|---|---|---|
| Example 1 | >99 | <1 | >99 |
| Example 2 | >99 | 22 | 73 |
| Example 3 | 73 | >99 | <1 |
| Example 4 | >99 | <1 | >99 |
| Comp. Example A | 0 | 0 | 0 |
| Comp. Example B | 0 | 0 | 0 |

What is claimed is:

1. A process for the preparation of polymeric alpha, omega-dialdehydes, diacids and mixtures thereof, which process comprises reacting a corresponding polymeric aliphatic alkane diol having the formula $HOCH_2$—(R)—$CH_2OH$ (I) wherein R represents a hydrogenated butadiene polymer, a hydrogenated isoprene polymer, a hydrogenated piperylene polymer, a hydrogenated hexadiene polymer, a hydrogenated methylpentadiene polymer, a hydrogenated phenylbutadiene polymer, a hydrogenated 3,4-dimethyl-1,3-hexadiene polymer, or a hydrogenated 4,5-diethyl-1,3-octadiene polymer, with a stable free radical nitroxide having the formula:

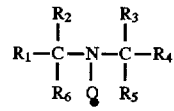

wherein (1) (a) each of $R_1$, $R_2$, $R_3$ and $R_4$ is an alkyl, aryl or heteroatom substituted alkyl group having 1 to about 15 carbon atoms, and (b) $R_5$ and $R_6$ (i) each is an alkyl group having 1 to about 15 carbon atoms provided that $R_1$–$R_6$ are not all alkyl groups, or a substituted alkyl group having 1 to about 15 carbon atoms wherein the substituent is hydrogen, cyano, —$CONH_2$, —$OCOCH$, $OCOC_2H_5$, carbonyl, alkenyl wherein the double bond is not conjugated with the nitroxide moiety, or —COOR wherein R of the —COOR group is alkyl or aryl, or (ii) together form part of a ring that contains at least 3 carbon atoms and up to two heteroatoms of O or N, (2) the

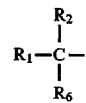

moiety and the

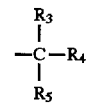

moiety individually are aryl, or (3) the

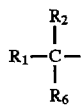

moiety and the

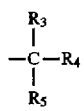

moiety together form a bicyclic ring with the proviso that the group directly adjacent to the

moiety is a bridgehead C—H, or a fully alkylated carbon, in the presence of a $NO_x$-generating compound and an oxidant, and thereafter separating out the polymeric alpha,omega-dialdehyde and/or diacid.

2. The process of claim 1 wherein said polymeric aliphatic alkane diol has a molecular weight in the range from about 500 to about 500,000.

3. The process of claim 2 wherein said polymeric aliphatic alkanediol has a molecular weight in the range of from about 1,000 to about 50,000.

4. The process of claim 1 wherein the stable free radical nitroxide is selected from the group consisting of 2,2,6,6,-tetramethylpiperidine-1-oxyl, 2,2,5,5-tetramethylpyrrolidin-1-oxyl, 2,2,7,7-tetramethylcycloheptan-1-oxyl, and mixtures thereof.

5. The process of claim 1 wherein the stable free radical nitroxide has the formula:

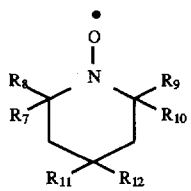

wherein each of $R_7$, $R_8$, $R_9$ and $R_{10}$ is an alkyl, aryl or heteroatom substituted alkyl group having 1 to about 15 carbon atoms and each of $R_{11}$ and $R_{12}$ is alkyl, hydrogen, aryl or a substituted heteroatom.

6. The process of claim 5 wherein the stable free radical nitroxide is selected from the group consisting of 2,2,6,6-tetramethylpiperidine-1-oxyl, 4-methoxy-2,2,6,6-tetramethylpiperidine-1-oxyl, 4-ethoxy-2,2,6,6-tetramethylpiperidine-1-oxyl, 4-acetylamino-2,2,6,6-tetramethylpiperidine-1-oxyl, 4-caramoyl-2,2,6,6-tetramethylpiperidine-1-oxyl, 4-benzoylamino-2,2,6,6-tetramethylpiperidine-1-oxyl, 4-pivaloylamino-2,2,6,6-tetramethylpiperidine-1-oxyl, 4-dodecyloylamino-2,2,6,6-tetramethylpiperidine-1-oxyl, 4-dodecanoylamino-2,2,6,6-tetramethylpiperidine-1-oxyl, 4-octanoylamino-2,2,6,6-tetramethylpiperidine-1-oxyl and mixtures thereof.

7. The process of claim 6 wherein the stable free radical nitroxide is selected from the group consisting of 2,2,6,6-tetramethylpiperidine-1-oxyl, 4-acetylamino-2,2,6,6-tetramethylpiperdine-1-oxyl, 4-methoxy-2, 2,6,6-tetramethylpiperidine-1-oxyl and mixtures thereof.

8. The process of claim 1 wherein said process is carried out in the presence of a solvent.

9. The process of claim 8 wherein said solvent is selected from the group consisting of dichloromethane, carbon tetrachloride, tertiary butyl alcohol/heptane, chlorobenzene, xylene and mixtures thereof.

10. The process of claim 8 wherein said process is carried out at a temperature in the range of from about 20° C. to about 60° C. and a pressure in the range of from about atmospheric pressure to about 2000 psig.

11. The process of claim 1 wherein said process is carried out in the presence of a bromide-containing compound.

12. The process of claim 1 wherein said $NO_x$-generating compound is nitric acid.

13. The process of claim 12 wherein the amount of nitric acid is in the range of from about 20 mole percent to about 500 mole percent, basis the moles of starting polymeric aliphatic alkanediol.

14. The process of claim 1 wherein said polymeric aliphatic alkanediol is contacted with said stable free radical nitroxide, followed by the addition thereto of said $NO_x$-generating compound.

15. The process of claim 14 wherein the amount of stable free radical nitroxide is in the range of from about 0.01 mole percent to about 200 mole percent, basis the number of moles of polymeric aliphatic alkanediol.

16. The process of claim 14 wherein the amount of $NO_x$-generating compound is in the range of from about 20 mole percent to about 500 mole percent, basis the number of moles of polymeric aliphatic alkanediol.

17. The process of claim 1 wherein said process is carried out in the presence of an oxidant.

18. The process of claim 17 wherein said oxidant is an oxygen-containing gas.

19. The process of claim 18 wherein said oxygen-containing gas is selected from the group consisting of pure oxygen and air.

20. The process of claim 1 wherein said process is carried out at a temperature in the range of from about 0° C. to about 60° C. and a pressure in the range of from about atmospheric pressure to about 2000 psig.

* * * * *